United States Patent Office 3,336,395
Patented Aug. 15, 1967

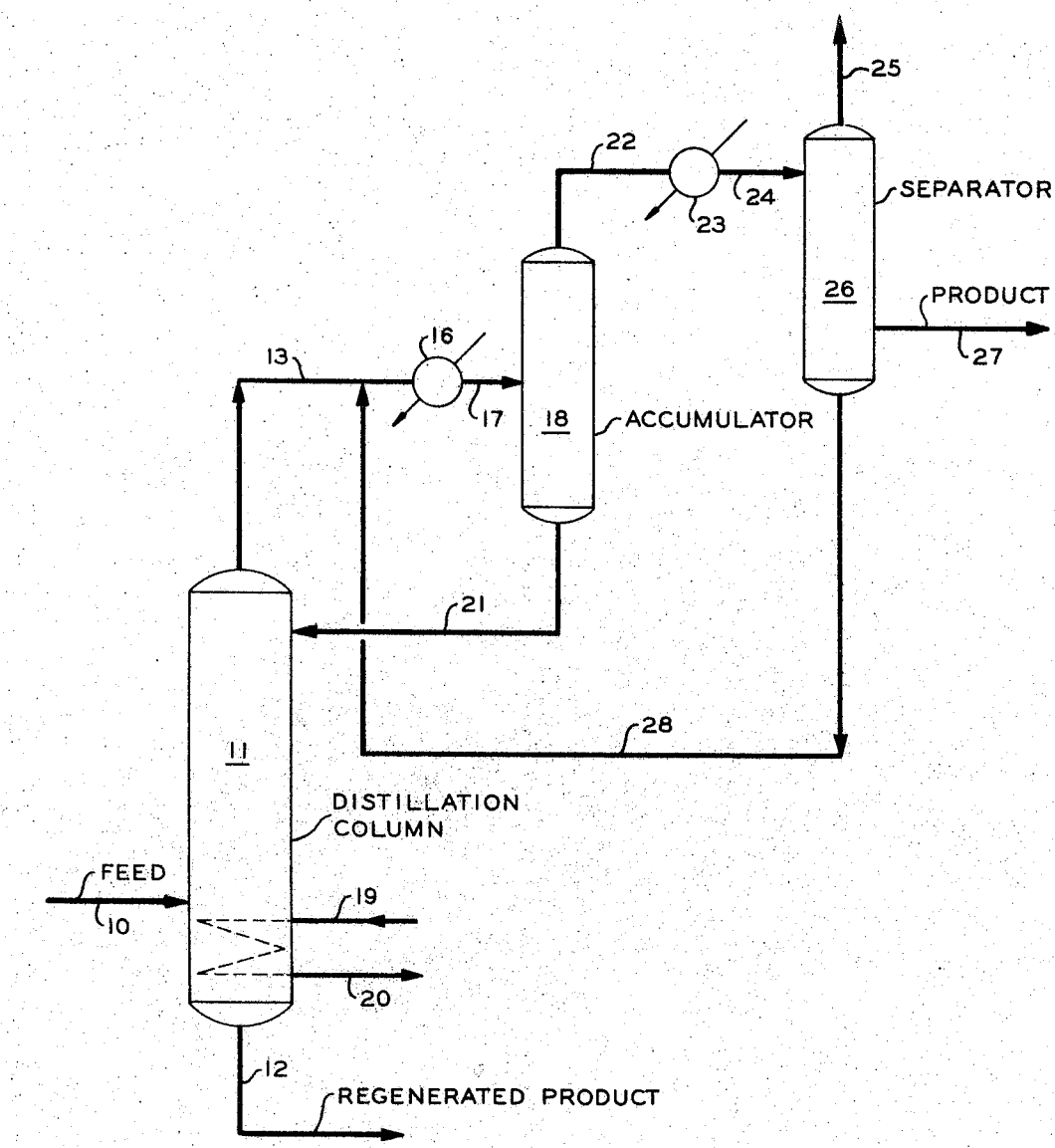

3,336,395
RECOVERY OF MERCAPTANS FROM ALKALINE
SOLUTIONS
Clifford W. Price, Bartlesville, Okla., assignor to Phillips
Petroleum Company, a corporation of Delaware
Filed June 26, 1964, Ser. No. 378,259
3 Claims. (Cl. 260—609)

This invention relates to a process and apparatus for the recovery of mercaptans from alkaline solutions containing mercaptides. In another aspect, this invention relates to a process and apparatus for the recovery of mercaptans from spent alkaline solutions containing mercaptides, said alkaline solutions employed for removing acidic components from hydrocarbon fractions.

Mercaptans in petroleum hydrocarbon fractions are objectionable as they impart noxious odors thereto. Additionally, mercaptans are antagonistic to tetraethyllead, a well known octane improver for gasoline, and cause corrosion of ferrous metal apparatus coming in contact therewith. Accordingly, it has been necessary to remove mercaptans from liquid petroleum fractions and the separation of mercaptans from the said liquid petroleum fractions has been universally practiced for many years. The term "liquid petroleum fraction" as herein employed also includes those normally gaseous hydrocarbon distillates and cracking products which are maintained in a liquid state during the demercaptanizing operation at super-atmospheric pressure.

Alkaline solutions, and particularly sodium hydroxide solutions, have been employed to a considerable extent for the removal of acidic components including mercaptans from hydrocarbon fractions. The treatment of the hydrocarbon fraction may be effected either in a batch or a continuous type of operation, the latter generally including a regenerative continuous system in which the alkaline solution is continuously or intermittently regenerated and the regenerated alkaline solution recycled for further use in the process.

When, for example, a caustic solution is employed to remove mercaptans from a hydrocarbon fraction, the caustic solution eventually becomes saturated with the mercaptan, generally in the form of sodium salts thereof, and the caustic solution no longer serves the purpose of extracting the acidic components from the hydrocarbon fraction.

Accordingly, an object of my invention is to provide an improved process and apparatus for the recovery of mercaptans from spent alkaline solutions.

Another object of my invention is to provide an improved process and apparatus for the regeneration of a spent alkaline solution.

Other objects, advantages and features of my invention will be readily apparent to those skilled in the art from the following description, the drawing and appended claims.

By my invention, I have provided a process and apparatus for introducing an alkaline solution containing a mercaptide into a distillation zone; partially condensing in a first condensing zone a vaporous mixture comprising water and mercaptan withdrawn from said distillation zone, passing the resultant vapor-liquid mixture to a first separation zone, passing the liquid from said first separation zone to the upper region of said distillation zone as reflux, substantially condensing the normally liquid constituents withdrawn from said first separation zone in a second condensing zone, passing an effluent from said second condensing zone to a second separation zone, withdrawing a mercaptan product from said second separation zone, recycling water from said second separation zone to said first condensing zone, and withdrawing a regenerated alkaline solution from said distillation zone.

The term "alkaline solution" as herein employed refers to the various alkaline solutions utilized for removing mercaptans from organic substances, particularly hydrocarbons. While sodium hydroxide solutions, hereinafter referred to as caustic solutions, are generally preferred, potassium hydroxide solutions can be used, as well as other alkali metal hydroxide solutions including those of lithium, rubidium and cesium. The last three named normally are too expensive for commercial use and, therefore, will find application only in special situations. In some instances, the alkaline earth metal hydroxides are employed, including those of calcium, strontium and barium.

The drawing is a schematic representation of one embodiment of the invention.

The invention will hereinafter be explained further with reference to the drawing as applied to the recovery of mercaptans from a spent caustic solution containing said mercaptans. It is to be understood that the broad scope of the invention is not to be limited to the embodiments described herein.

Referring to the drawing, a spent caustic solution containing mercaptides is passed via conduit means 10 into an intermediate region of a vertical distillation column 11. The caustic solution introduced into distillation column 11 had been employed to remove mercaptans from a butane fraction. The spent caustic solution is introduced into distillation column 11 at the rate of 55 gallons per minute and at a temperature of 200° F. A heat exchange medium such as steam is passed via conduit means 19 to distillation column 11 and withdrawn from distillation column 11 via conduit means 20. A top temperature of 220° F., a top pressure of 7 p.s.i.g., a bottom temperature of 240° F., and a bottom pressure of 8.5 p.s.i.g. is maintained within distillation column 11.

A regenerated caustic solution is withdrawn from distillation column 11 via conduit means 12, said caustic solution having a sodium hydroxide concentration of 10 percent by weight. The regenerated caustic solution can be recycled to the hydrocarbon treating process step or it can be combined with additional or fresh caustic solution and the combined caustic solution passed to the hydrocarbon treating process step.

A vaporous fraction is withdrawn from the top of distillation column 11 via conduit means 13 and passed to a conventional heat exchange means 16 such as a U-tube heat exchanger wherein the vaporous fraction is partially condensed. An effluent vapor-liquid mixture at a temperature of 200° F. and a pressure of 6 p.s.i.g. is passed from heat exchange means 16 via conduit means 17 to an accumulator 18. Preferably, a temperature and pressure in the range of 180–200° F. and 5–7 p.s.i.g., respectively, is maintained within accumulator 18. A liquid comprising water is recycled from accumulator 18 via conduit means 21 to the upper region of distillation column 11 as reflux at the rate of 27 gallons per minute.

A vaporous fraction comprising propane, isobutane, n-butane, methyl mercaptan, ethyl mercaptan and water is withdrawn from the top of accumulator 18 via conduit means 22 and passed to a second heat exchange means 23 such as a U-tube heat exchanger. Within heat exchange means 23, the normally liquid components of the vaporous feed to heat exchanger 23 are substantially condensed. The effluent mixture at a temperature of 85° F. and a pressure of 5 p.s.i.g. is passed from heat exchange means 23 via conduit means 24 to separator 26, said effluent mixture having the following composition:

| | Pounds per day |
|---|---|
| Propane | 77.9 |
| Iso-butane | 67.9 |
| n-Butane | 283.6 |
| Methyl mercaptan | 1170.2 |
| Ethyl mercaptan | 2252.5 |
| Water | 1508.1 |
| Total | 5360.3 |

With separator 26, the feed mixture is separated, a residual gaseous fraction withdrawn from separator 26 via conduit means 25, a mercaptan product fraction withdrawn from an intermediate region of separator 26 via conduit means 27, and a water fraction recycled from separator 26 via conduit means 28 and conduit means 13 to heat exchange means 16. Preferably, a temperature in the range of 65–85° F. is maintained within separator 26. The residual gaseous fraction withdrawn from separator 26 via conduit means 25 has the following composition:

| | Pounds per day |
|---|---|
| Propane | 73.9 |
| Iso-butane | 63.8 |
| n-Butane | 266.8 |
| Methyl mercaptan | 923.0 |
| Ethyl mercaptan | 448.9 |
| Water | 22.1 |
| Total | 1798.5 |

The residual gaseous stream withdrawn from separator 26 via conduit means 25 can be flared or otherwise employed.

A mercaptan product fraction having the following composition is withdrawn from separator 26 via conduit means 27 at the rate of 302.5 liquid gallons per day.

| | Pounds per day |
|---|---|
| Propane | 4.0 |
| Iso-butane | 4.1 |
| n-Butane | 16.8 |
| Methyl mercaptan | 245.3 |
| Ethyl mercaptan | 1794.3 |
| Heavier mercaptans | 25.0 |
| Water | 8.6 |
| Total | 2098.1 |

A water fraction at the rate of 1477.4 liquid pounds per day containing 1.9 pounds per day of methyl mercaptan and 9.3 pounds per day of ethyl mercaptan is passed from separator 26 via conduit means 28 and conduit means 13 to heat exchange means 16. Preferably, as illustrated, the recycled water is combined with the overhead vaporous fraction and the combined mixture passed to heat exchange means 16.

By recycling the water from separator 26 to conduit 13 in the described manner, in place of disposing of the water to a sewer or the like, a source of mercaptan odor, very obnoxious to people, is eliminated. The mercaptans in the recycled water, both dissolved and in suspension, are subsequently recovered in the product mercaptan stream.

A second advantage of the invention is that by recycling the cooled water in the described manner, the heat load on heat exchange means 16 is substantially reduced, effecting substantial savings in cooling energy required to at least partially condense the vaporous fraction withdrawn from column 11.

An additional advantage of recycling the water from separator 26 is that by recycling the water to heat exchange means 16 and subsequently to accumulator 18, the water is recycled to distillation column 11 as reflux, preventing the caustic from becoming concentrated in distillation column 11, and as a result thereof, becoming more corrosive to distillation column 11 and its reboiler.

As will be evident to this skilled in the art, various modifications of this invention can be made, or followed, in the light of the foregoing disclosure, without departing from the spirit or scope thereof.

I claim:
1. A process of recovering mercaptans from an aqueous alkaline solution containing alkali or alkaline earth metal mercaptides comprising:
   (a) passing said solution to a distillation zone and heating said solution to form said mercaptans;
   (b) withdrawing a first vapor stream comprising said mercaptans and water from the upper region of said distillation zone;
   (c) cooling said first vapor stream in a first cooling zone sufficient to condense at least a portion of said water and substantially none of said mercaptans to form a first liquid vapor stream;
   (d) passing said first liquid vapor stream to a first accumulation zone;
   (e) removing a liquid-water phase from the lower region of said first accumulation zone;
   (f) passing a second vapor stream from the upper region of said first accumulation zone to a second cooling zone and cooling said second vapor stream sufficient to condense a substantial portion of the mercaptans contained therein to form a second liquid vapor stream;
   (g) passing said second liquid vapor stream to a second accumulation zone;
   (h) removing a water phase containing a minor portion of mercaptans from the bottom of said second accumulation zone and passing it to the first vapor stream entering said first cooling zone;
   (i) removing a liquid mercaptan product stream from the lower region of said second accumulation zone;
   (j) removing a third vapor stream from the upper region of said second accumulation zone;
   (k) withdrawing a regenerated alkaline solution from the lower region of said distillation zone.
2. The process of claim 9 wherein said aqueous alkaline solution also contains $C_2$-$C_4$ hydrocarbon impurities, and a major protion of said mercaptans are methyl and ethyl mercaptans.
3. The process of claim 10 wherein said distillation zone is maintained from 220–240° F. and from 6 to 8.5 p.s.i.g., said first vapor stream comprises said hydrocarbon impurities, water, and said mercaptans; said first liquid vapor stream in said first accumulation zone is maintained from 180–200° F. and from 5–7 p.s.i.g.; said second vapor stream comprises said hydrocarbon impurities, water, and said mercaptans; said third liquid vapor stream is maintained at 65–85° F. and from 0–5 p.s.i.g.; and said liquid mercaptan product comprises a major portion of the ethyl mercaptan originally in said first vapor phase.

References Cited

UNITED STATES PATENTS 2,455,656  12/1948  Cauley _____ 260—608

CHARLES B. PARKER, *Primary Examiner.*

DELBERT R. PHILLIPS, *Assistant Examiner.*

UNITED STATES PATENT OFFICE

CERTIFICATE OF CORRECTION

Patent No. 3,336,395                                            August 15, 1967

Clifford W. Price

It is hereby certified that error appears in the above numbered patent requiring correction and that the said Letters Patent should read as corrected below.

Column 4, line 51, for the claim reference numeral "9" read -- 1 --; line 53, for "protion" read -- portion --; line 55, for the claim reference numeral "10" read -- 2 --.

Signed and sealed this 7th day of January 1969.

(SEAL)
Attest:

Edward M. Fletcher, Jr.                          EDWARD J. BRENNER
Attesting Officer                                    Commissioner of Patents